(12) United States Patent
Nishiura

(10) Patent No.: US 11,958,464 B2
(45) Date of Patent: Apr. 16, 2024

(54) BRAKE CONTROL APPARATUS AND BRAKE SYSTEM

(71) Applicant: Hitachi Astemo, Ltd., Hitachinaka (JP)

(72) Inventor: Chikara Nishiura, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 421 days.

(21) Appl. No.: 17/293,780

(22) PCT Filed: Oct. 31, 2019

(86) PCT No.: PCT/JP2019/042774
§ 371 (c)(1),
(2) Date: May 13, 2021

(87) PCT Pub. No.: WO2020/100610
PCT Pub. Date: May 22, 2020

(65) Prior Publication Data
US 2022/0009460 A1   Jan. 13, 2022

(30) Foreign Application Priority Data

Nov. 16, 2018 (JP) ................................ 2018-215123

(51) Int. Cl.
*B60T 8/48* (2006.01)
*B60T 7/04* (2006.01)
(Continued)

(52) U.S. Cl.
CPC ............ *B60T 8/4081* (2013.01); *B60T 7/042* (2013.01); *B60T 13/686* (2013.01); *B60T 2220/04* (2013.01)

(58) Field of Classification Search
CPC ........ B60T 8/40; B60T 8/4081; B60T 13/686; B60T 7/042; B60T 2220/04
(Continued)

(56) References Cited

U.S. PATENT DOCUMENTS

| 5,567,021 A | 10/1996 | Gaillard |
| 5,588,718 A | 12/1996 | Winner et al. |

(Continued)

FOREIGN PATENT DOCUMENTS

| DE | 43 40 467 A1 | 6/1995 |
| DE | 43 43 314 A1 | 6/1995 |
| JP | 2010-83411 A | 4/2010 |

OTHER PUBLICATIONS

International Search Report (PCT/ISA/210) issued in PCT Application No. PCT/JP2019/042774 dated Dec. 17, 2019 with English translation (three (3) pages).

(Continued)

*Primary Examiner* — Christopher P Schwartz
(74) *Attorney, Agent, or Firm* — Crowell & Moring LLP

(57) ABSTRACT

A control unit determines a final target wheel cylinder hydraulic pressure of a wheel cylinder based on a stroke-target wheel cylinder hydraulic pressure if an acquired simulator stroke position is smaller than a stroke limit, and determines the final target wheel cylinder hydraulic pressure of the wheel cylinder based on the stroke-target wheel cylinder hydraulic pressure and a master cylinder hydraulic pressure-target wheel cylinder hydraulic pressure if the acquired simulator stroke position is equal to or greater than the stroke limit.

12 Claims, 11 Drawing Sheets

(51) Int. Cl.
*B60T 8/40* (2006.01)
*B60T 13/68* (2006.01)

(58) Field of Classification Search
USPC .......... 303/113.1–113.4, 114.1, 116.1, 116.2
See application file for complete search history.

(56) References Cited

U.S. PATENT DOCUMENTS

| | | | | |
|---|---|---|---|---|
| 6,672,685 B2 * | 1/2004 | Ishimura | ............... | B60T 13/686 |
| | | | | 303/DIG. 11 |
| 6,957,870 B2 * | 10/2005 | Kagawa | ................ | B60T 13/686 |
| | | | | 303/155 |
| 7,159,696 B2 * | 1/2007 | Kusano | ................... | B60T 11/16 |
| | | | | 188/152 |
| 9,663,086 B2 * | 5/2017 | Ozeki | ................... | B60T 13/686 |
| 2011/0175437 A1 | 7/2011 | Yamamoto et al. | | |
| 2021/0339724 A1 * | 11/2021 | Maruo | ................... | B60T 7/042 |

OTHER PUBLICATIONS

Japanese-language Written Opinion (PCT/ISA/237) issued in PCT Application No. PCT/JP2019/042774 dated Dec. 17, 2019 with English translation (seven (7) pages).
Supplementary European Search Report issued in European Application No. 19885381.4 dated Nov. 12, 2021 (nine (9) pages).

* cited by examiner

BRAKE CONTROL APPARATUS AND BRAKE SYSTEM

TECHNICAL FIELD

The present invention relates to a brake control apparatus and a brake system.

BACKGROUND ART

PTL 1 discloses a brake control apparatus including a shut-off valve provided in a fluid passage connecting a master cylinder and a wheel cylinder, a pump for supplying brake fluid to a fluid passage connecting the shut-off valve and the wheel cylinder, and a stroke simulator connected to the master cylinder. The brake control apparatus controls a hydraulic pressure in the wheel cylinder based on a detection signal from a stroke sensor that detects a pedal stroke as an operation amount on a brake pedal.

CITATION LIST

Patent Literature

PTL 1: Japanese Patent Application Public Disclosure No. 2010-83411

SUMMARY OF INVENTION

Technical Problem

However, the brake control apparatus discussed in the above-described patent literature, PTL 1 fails to take into any consideration realization of both the securement of an excellent pedal feeling and the securement of a braking force against a change in a brake environment, thereby raising a possibility that the pedal feeling is deteriorated or the braking force falls short when a change occurs in the brake environment.

Solution to Problem

One of objects of the present invention is to provide a brake control apparatus and a brake system capable of realizing both the securement of an excellent pedal feeling and the securement of a braking force regardless of a change in a brake environment.

According to one aspect of the present invention, a brake control apparatus controls a hydraulic pressure source so as to increase a brake hydraulic pressure to generate in a braking force application portion according to an increase in a stroke of a brake pedal, and control the hydraulic pressure source so as to increase the brake hydraulic pressure to generate in the braking force application portion even after a stroke of a stroke simulator configured to generate an operation reaction force of the brake pedal is restricted

Advantageous Effects of Invention

Therefore, according to the one aspect of the present invention, the brake control apparatus can realize both the securement of an excellent pedal feeling and the securement of a braking force regardless of a change in a brake environment.

DESCRIPTION OF EMBODIMENTS

First Embodiment

Figure 1:
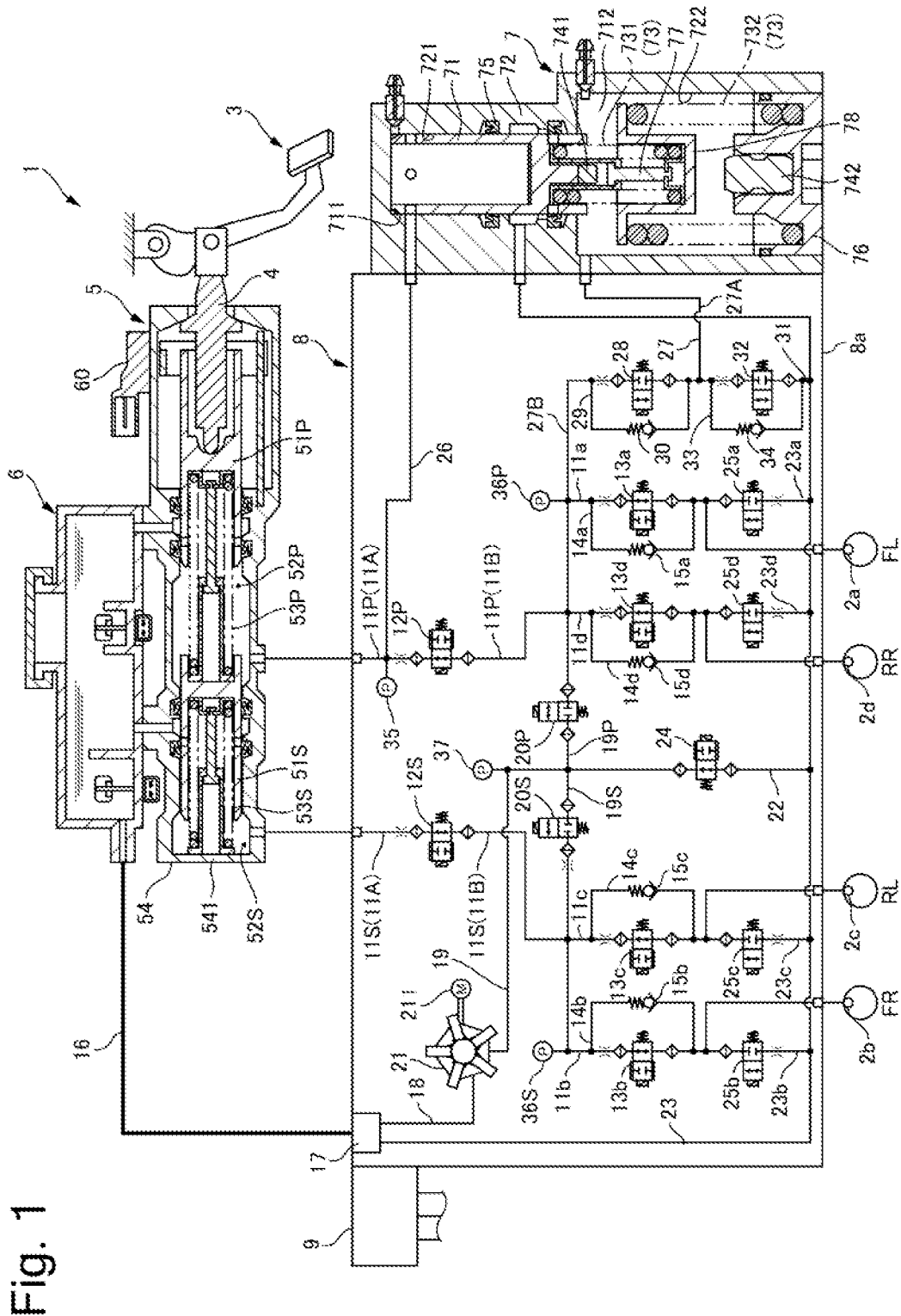
FIG. 1 illustrates the configuration of a brake system 1 according to a first embodiment.

FIG. 1 illustrates the configuration of a brake system 1 according to a first embodiment.

The brake system 1 is mounted on a hybrid automobile including an electric motor (a generator) in addition to an internal combustion engine, an electric automobile including only an electric motor, and the like, besides a general vehicle including only an internal combustion engine (an engine) as a prime mover that drives each of wheels (a wheel portion) FL to RR. The brake system 1 includes a disk brake mounted on each of the wheels (a front left wheel FL, a front right wheel FR, a rear left wheel RL, and a rear right wheel RR)

as the wheel portion and configured to be actuated according to a hydraulic pressure in a wheel cylinder 2 (a braking force application portion). The brake system 1 applies a braking force to each of the wheels FL to RR by adjusting the hydraulic pressure in the wheel cylinder 2. The brake system 1 includes two brake pipe systems (a primary P system and a secondary S system). The brake pipe configuration is, for example, the X-split pipe configuration. Hereinafter, when a member corresponding to the primary system (hereinafter abbreviated as a P system) and a member corresponding to the secondary system (hereinafter abbreviated as an S system) are distinguished from each other, indexes P and S will be added at the ends of the reference numerals. Further, when a member corresponding to each of the wheels FL to RR is distinguished from one another, indexes a to d will be added at the ends of the reference numerals thereof.

A brake pedal 3 is a brake operation member that receives an input of a driver's brake operation. A push rod 4 strokes according to the operation on the brake pedal 3. A master cylinder 5 is actuated according to the amount of the stroke of the push rod 4 to generate a brake hydraulic pressure (a master cylinder hydraulic pressure).

The master cylinder 5 is replenished with brake fluid from a reservoir tank 6 storing the brake fluid therein. The master cylinder 5 is a tandem-type master cylinder, and includes a primary piston 51P and a secondary piston 51S, which stroke according to the stroke of the push rod 4. These pistons 51P and 51S are arranged in series along the axial direction of the push rod 4. The primary piston 51P is connected to the push rod 4. The secondary piston 51S is configured as a free piston. A stroke sensor 60 is mounted on the master cylinder 5. The stroke sensor 60 detects the stroke amount of the primary piston 51P as a pedal stroke amount of the brake pedal 3.

A stroke simulator 7 is actuated in reaction to the driver's brake operation. The stroke simulator 7 generates a pedal stroke with the aid of an inflow of the brake fluid flowing out of inside the master cylinder 5 according to the driver's brake operation. A piston 71 of the stroke simulator 7 is actuated axially in a cylinder 72 against the biasing force of a spring 73 due to the brake fluid supplied from the master cylinder 5. By this operation, the stroke simulator 7 generates an operation reaction force according to the driver's brake operation.

A hydraulic pressure unit 8 can provide the braking force to each of the wheels FL to RR independently of the driver's brake operation. The hydraulic pressure unit 8 receives supply of the brake fluid from the master cylinder 5 and the reservoir tank 6. The hydraulic pressure unit 8 is disposed between the master cylinder 5 and the wheel cylinders 2. The hydraulic pressure unit 8 includes a motor 211 of a pump (a hydraulic pressure source) 21 and a plurality of electromagnetic valves (shut-off valves 12 and the like) as actuators for generating a control hydraulic pressure. The pump 21 sucks the brake fluid from the reservoir tank 6, and discharges the brake fluid toward the wheel cylinders 2. The pump 21 is, for example, a plunger pump. The motor 211 is, for example, a brushed motor. The shut-off valves 12 and the like perform opening/closing operations according to control signals to switch the communication states of fluid passages 11 and the like, thereby controlling the flow of the brake fluid. The hydraulic pressure unit 8 increases the pressures in the wheel cylinders 2 with use of the brake hydraulic pressure generated by the pump with the master cylinder 5 and the wheel cylinders 2 out of communication with each other. Further, the hydraulic pressure unit 8 includes hydraulic pressure sensors 35 to 37, which detect hydraulic pressures at the respective locations.

A control unit 9 controls the actuation of the hydraulic pressure unit 8. Information regarding the running state transmitted from the vehicle side (the wheel speed and the like) is input to the control unit 9 in addition to the detection values transmitted from the stroke sensor 60 and the hydraulic pressure sensors 35 to 37. The control unit 9 performs information processing according to a built-in program based on the input various kinds of information to calculate a target wheel cylinder hydraulic pressure of each of the wheel cylinders 2. The control unit 9 outputs an instruction signal to each of the actuators in the hydraulic pressure unit 8 in such a manner that the wheel cylinder hydraulic pressure in the wheel cylinder 2 matches the target wheel cylinder hydraulic pressure. As a result, the brake system 1 can realize various kinds of brake control (boosting control, anti-lock control (ABS), brake control for vehicle motion control, autonomous brake control, regenerative cooperative brake control, and the like). The boosting control assists the brake operation by generating a brake hydraulic pressure by which the driver's brake pressing force is insufficient. The anti-lock control prevents a braking slip (a lock tendency) of each of the wheels FL to RR. The vehicle motion control is vehicle behavior stabilization control for preventing a side-slip and the like. The autonomous brake control is preceding vehicle following control, autonomous emergency brake, and the like. The regenerative cooperative brake control controls the wheel cylinder hydraulic pressure so as to achieve a target deceleration in cooperation with regenerative brake.

Both the pistons 51P and 51S of the master cylinder 5 are contained in a cylinder 54. A primary hydraulic pressure chamber 52P is defined between the two pistons 51P and 51S of the master cylinder 5. A compression coil spring 53P is set in the primary hydraulic pressure chamber 52P. A secondary hydraulic pressure chamber 52S is defined between the secondary piston 51S and a bottom portion 541 of the cylinder 54. A compression coil spring 53S is set in the secondary hydraulic pressure chamber 52S. The fluid passage (a connection fluid passage) 11 is opened to each of the hydraulic pressure chambers 52P and 52S. Each of the hydraulic pressure chambers 52P and 52S is connectable to the hydraulic pressure unit 8 and is also communicable with the wheel cylinders 2 via the fluid passage 11.

The driver's operation of pressing the brake pedal 3 causes the strokes of the pistons 51, thereby generating the master cylinder hydraulic pressures according to reductions in the volumes of the hydraulic pressure chambers 52. Generally equal master cylinder hydraulic pressures are generated in the two hydraulic pressure chambers 52P and 52S. As a result, the brake fluid is supplied from the hydraulic pressure chambers 52 toward the wheel cylinders 2 via the fluid passages 11. The master cylinder 5 increases the pressures in the wheel cylinders 2a and 2d of the P system via a fluid passage of the P system (a fluid passage 11P) with use of the master cylinder hydraulic pressure generated in the primary hydraulic pressure chamber 52P. Further, the master cylinder 5 increases the pressures in the wheel cylinders 2b and 2c of the S system via a fluid passage of the S system (a fluid passage 11S) with use of the master cylinder hydraulic pressure generated in the secondary hydraulic pressure chamber 52S.

The stroke simulator 7 includes the cylinder 72, the piston 71, the spring 73, and a damper 74. The cylinder 72 has a cylindrical inner peripheral surface. The cylinder 72 includes a piston containing portion 721 and a spring containing portion 722. The piston containing portion 721 is smaller in diameter than the spring containing portion 722. A fluid passage 27, which will be described below, is constantly opened on the inner peripheral surface of the spring containing portion 722. The piston 71 is axially movable in the piston containing portion 721. The piston 71 divides the inside of the cylinder 72 into a positive pressure chamber (a first chamber) 711 and a back-pressure chamber (a second chamber) 712. A fluid passage 26 is constantly opened to the positive-pressure chamber 711. The fluid passage 27 is constantly opened to the back-pressure chamber 712. A piston seal 75 is set on the outer periphery of the piston 71. The piston seal 75 is in sliding contact with the inner peripheral surface of the piston containing portion 721, and seals between the inner peripheral surface of the piston containing portion 721 and the outer peripheral surface of the piston 71. The piston seal 75 is a separation seal member that seals between the positive pressure chamber 711 and the back-pressure chamber 712 to thereby liquid-tightly separate them, and complements the function of the piston 71.

The spring 73 is a compression coil spring set in the back-pressure chamber 712, and biases the piston 71 from the back-pressure chamber 712 side toward the positive pressure chamber 711 side. The spring 73 generates a reaction force according to the compression amount. The spring 73 includes a first spring 731 and a second spring 732. The first spring 731 is smaller in diameter and shorter in length than the second spring 732, and has a short wire diameter. The first spring 731 and the second spring 732 are disposed in series between the piston 71 and the spring containing portion 722 via a retainer member 78. The damper 74 includes a first damper 741 and a second damper 742. The first damper 741 is an elastic member such as rubber, and has a columnar shape. The second damper 742 is an elastic member such as rubber, and has a columnar shape narrowed at the axially central portion thereof. The first damper 741 is installed at the distal end of the piston 71 on the back-pressure chamber 712 side. The second damper 742 is installed on a plug member 76 closing the spring containing chamber 722 so as to face the retainer member 78. A stopper member 77 is fixed on the retainer member 78. As illustrated in FIG. 1, when the piston 71 is located at an initial position where the piston 71 is maximumly displaced to the positive pressure chamber 711 side, a first gap is generated between the first damper 741 and the stopper member 77, and a second gap is generated between the second damper 742 and the retainer member 78.

In the stroke simulator 7, the piston 71 is axially moved toward the back-pressure chamber 712 side while pressing and compressing the first spring 731 and the like, when the brake fluid flows into the positive pressure chamber 711 according to the driver's brake operation and a hydraulic pressure (the master cylinder pressure) equal to or higher than a predetermined pressure is applied to the pressure-receiving surface of the piston 71 in the positive pressure chamber 711. At this time, the volume of the positive pressure chamber 711 increases, and, at the same time, the volume of the back-pressure chamber 712 reduces. As a result, the brake fluid transmitted out of the secondary hydraulic pressure chamber 52S flows into the positive pressure chamber 711, and, at the same time, the brake fluid is transmitted out of the back-pressure chamber 712 so that the brake fluid in the back-pressure chamber 712 is discharged. At this time, when the first spring 731 is compressed by a distance equal to or longer than the first gap, the first damper 741 is elastically deformed by being sandwiched between the piston 71 and the stopper member 77. When the second spring 732 is compressed by a distance equal to or longer than the second gap, the second damper 742 is elastically deformed by being sandwiched between the retainer member 78 and the plug member 76. These operations help a reduction in the impact and also make adjustable the relationship (the characteristic) between the pedal pressing force (the pedal reaction force) and the pedal stroke. Therefore, the pedal operation feeling can be improved. When the pressure in the positive pressure chamber 711 reduces to lower than the predetermined pressure, the piston 71 is returned to the initial position due to the biasing force (the elastic force) of the spring 731 and the like.

The hydraulic pressure unit 8 includes a housing 8a. The housing 8a includes a plurality of fluid passages (the fluid passages 11 and the like). The pump 21, the motor 211, and the plurality of electromagnetic valves (shut-off valves 12 and the like) are fixed to the housing 8a. The fluid passages 11 connect the hydraulic pressure chambers 52 of the master cylinder 5 and the wheel cylinders 2 to each other. The fluid passage 11P branches off into a fluid passage 11a and a fluid passage 11d. The fluid passage 11S branches off into a fluid passage 11b and a fluid passage 11d. The shut-off valves 12 are normally-opened (opened when no electric power is supplied thereto) electromagnetic proportional valves provided in the fluid passages 11. The electromagnetic proportional valve can realize an arbitrary opening degree according to an electric current supplied to the solenoid. Each of the fluid passages 11 is divided into a fluid passage 11A on the master cylinder 5 side and a fluid passage 11B on the wheel cylinder 2 side by the shut-off valve 12.

Solenoid IN valves 13 are normally-opened electromagnetic proportion valves provided in correspondence with the individual wheels FL to RR on the wheel cylinder 2 side (in the fluid passages 11a to 11d) with respect to the shut-off valves 12 in the fluid passages 11. Bypass fluid passages 14 are provided in the fluid passages 11. The bypass fluid passages 14 bypass the solenoid IN valves 13. A check valve 15 is provided in each of the bypass fluid passages 14. The check valve 15 permits only a flow of the brake fluid from the wheel cylinder 2 side toward the master cylinder 5 side.

An intake pipe 16 connects the reservoir tank 6 and an internal reservoir 17 formed in the housing 8a. A fluid passage 18 connects the internal reservoir 17 and the intake side of the pump 21. A fluid passage 19 connects the discharge side of the pump 21 and a portion in each of the fluid passages 11B between the shut-off valve 12 and the solenoid IN 13. The fluid passage 19 branches off into a fluid passage 19P of the P system and a fluid passage 19S of the S system. The two fluid passages 19P and 19S are connected to the fluid passages 11P and 11S, respectively. The two fluid passages 19P and 19S function as a communication passage connecting the fluid passages 11P and 11S to each other. Communication valves 20 are normally-closed (closed when no electric power is supplied thereto) ON/OFF valves provided in the fluid passages 19. The ON/OFF valve is switched between two values, i.e., switched to be either opened or closed according to an electric current supplied to the solenoid.

The pump 21 generates the wheel cylinder hydraulic pressures by generating the hydraulic pressures in the fluid passages 11 with use of the brake fluid supplied from the reservoir tank 6. The pump 21 is connected to the wheel cylinders 2a to 2d via the fluid passages 19 and the fluid passages 11P and 11S, and increases the pressures in the wheel cylinders 2 by discharging the brake fluid to the fluid passages 19.

A fluid passage 22 connects a branch point between the two fluid passages 19P and 19S and fluid passages 23 to each other. A pressure adjustment valve 24 is provided in the fluid passage 22. The pressure adjustment valve 24 is a normally-opened electromagnetic proportional valve. The fluid passages 23 connect the wheel cylinder 2 side of the fluid passages 11B with respect to the solenoid IN valves 13, and the internal reservoir 17 to each other. Solenoid OUT valves 25 are normally-closed ON/OFF valves provided in the fluid passages 23.

The fluid passage 26 branches off from the fluid passage 11A of the P system to be connected to the positive pressure chamber 711 of the stroke simulator 7. The hydraulic pressure unit 8 may be configured in such a manner that the fluid passage 26 directly connects the primary hydraulic pressure chamber 52P and the positive-pressure chamber 711 without the intervention of the fluid passage 11P (11A).

The fluid passage 27 connects the back-pressure chamber 712 of the stroke simulator 7 and the fluid passage 11P (11A) therebetween. More specifically, the fluid passage 27 branches off from a portion in the fluid passage 11P (11B) between the shut-off valve 12P and the solenoid IN valves 13 to be connected to the back-pressure chamber 712. A stroke simulator IN valve 28 is a normally-closed ON/OFF valve provided in the fluid passage 27. The fluid passage 27 is divided into a fluid passage 27A on the back-pressure 712 side and a fluid passage 27B on the fluid passage 11 side by the stroke simulator IN valve 28. A bypass fluid passage 29 is provided in parallel with the fluid passage 27 while bypassing the stroke simulator valve IN 28. The bypass fluid passage 29 connects the fluid passage 27A and the fluid passage 27B to each other therebetween. A check valve 30 is provided in the bypass fluid passage 29. The check valve 30 permits a flow of the brake fluid heading from the fluid passage 27A toward the fluid passage 11 (27B) side, and prohibits a flow of the brake fluid in the opposite direction therefrom.

A fluid passage 31 connects the back-pressure chamber 712 of the stroke simulator 7 and the fluid passages 23 to each other therebetween. A stroke simulator OUT valve 32 is a normally-closed ON/OFF valve provided in the fluid passage 31. A bypass fluid passage 33 is provided in parallel with the fluid passage 31 while bypassing the stroke simulator OUT valve 32. A check valve 34 is provided in the bypass fluid passage 33. The check valve 34 permits a flow of the brake fluid heading from the fluid passage 23 side toward the back-pressure chamber 712 side, and prohibits a flow of the brake fluid in the opposite direction therefrom.

The master cylinder hydraulic pressure sensor 35 is provided between the shut-off valve 12P and the master cylinder 5 (the fluid passage 11A) in the first fluid passage 11P. The master cylinder hydraulic pressure sensor 35 detects a hydraulic pressure at this portion (the master cylinder hydraulic pressure). The wheel cylinder hydraulic pressure sensors (a P-system pressure sensor and an S-system pressure sensor) 36 are provided between the shut-off valves 12 and the solenoid IN valves 13 in the first fluid passages 11. The wheel cylinder hydraulic pressure sensors 36 detect hydraulic pressures at these portions (the wheel cylinder hydraulic pressures). The discharge pressure sensor 37 is provided between the discharge side of the pump 21 and the communication valves 20 in the fluid passages 19. The discharge pressure sensor 37 detects a hydraulic pressure at this portion (the pump discharge pressure).

A first system is formed by a brake system (the fluid passages 11) that connects the hydraulic pressure chambers 52 of the master cylinder 5 and the wheel cylinders 2 to each other therebetween with the shut-off valves 12 opened. This first system can realize pressing force brake (non-boosting control) by generating the wheel cylinder hydraulic pressures from the master cylinder hydraulic pressures generated with use of the pressing force. On the other hand, a second system is formed by a brake system (the fluid passage 19, the fluid passage 22, the fluid passages 23, and the like) that includes the pump 21 and connects the reservoir tank 6 and the wheel cylinders 2 to each other therebetween with the shut-off valves 12 closed. This second system constructs a so-called brake-by-wire device, which generates the wheel cylinder hydraulic pressures from the hydraulic pressure generated with use of the pump 21, and can realize the boosting control and the like as brake-by-wire control. At the time of the brake-by-wire control, the stroke simulator 7 creates the operation reaction force accompanying the driver's brake operation.

Figure 2:
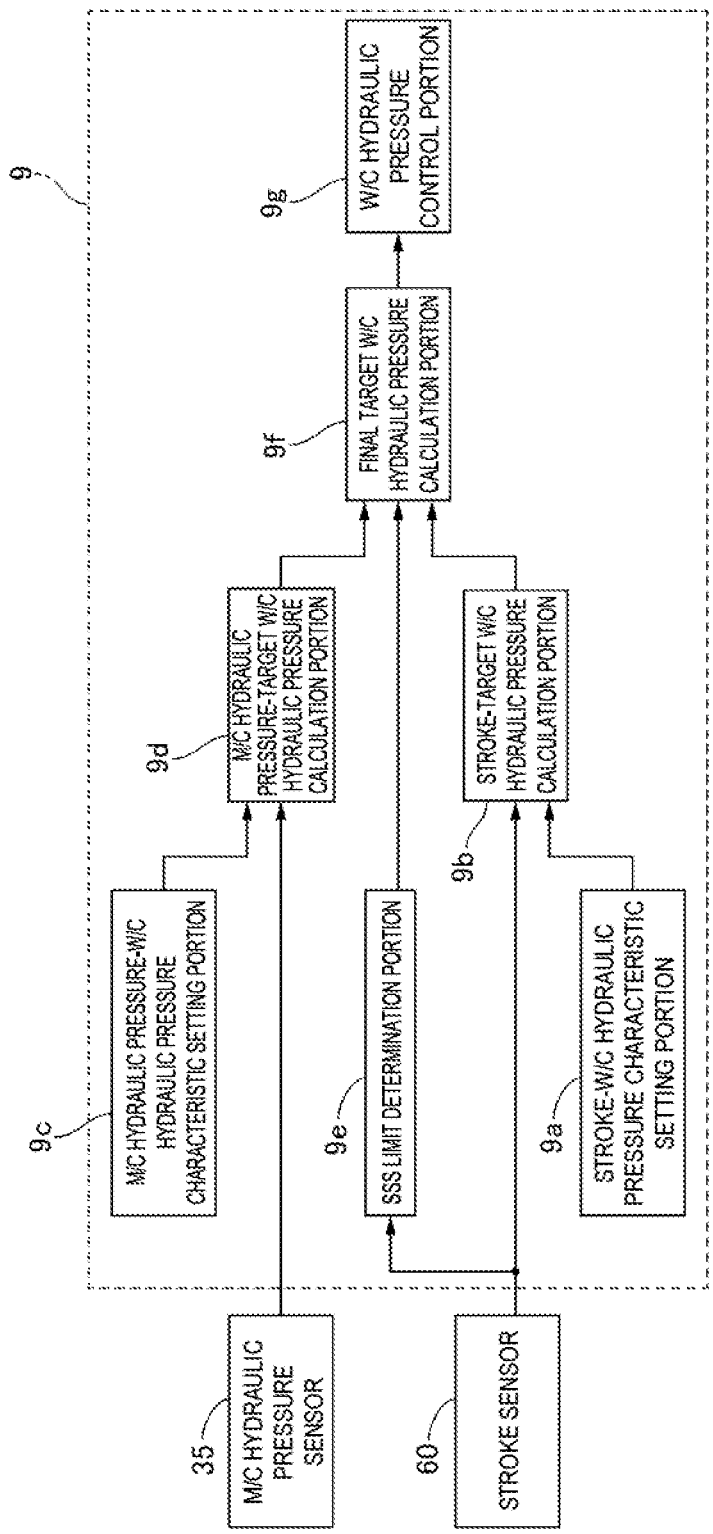
FIG. 2 is a control block diagram of a control unit 9 according to the first embodiment.

FIG. 2 is a control block diagram of the control unit 9 according to the first embodiment.

Figure 3:
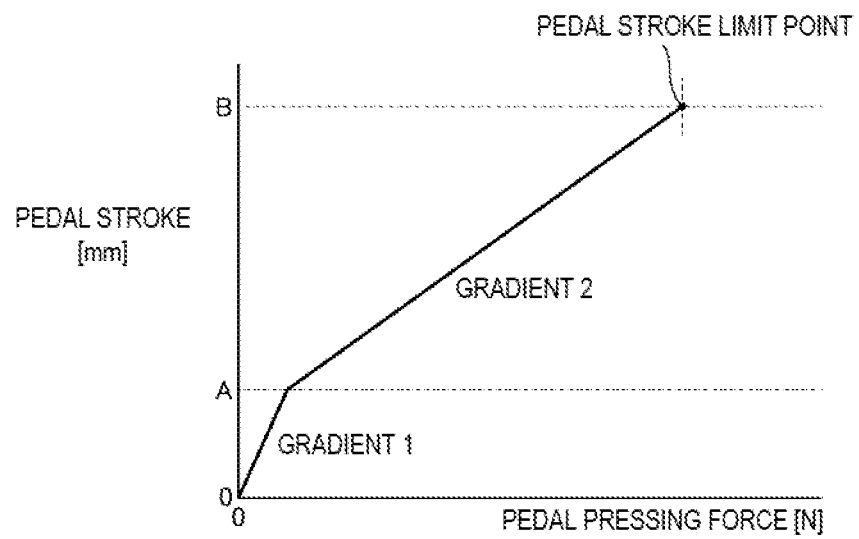
FIG. 3 illustrates a pedal stroke characteristic with respect to a pedal pressing force in the brake system 1 according to the first embodiment.

A stroke-wheel cylinder hydraulic pressure characteristic setting portion 9a sets a stroke-target wheel cylinder hydraulic pressure characteristic with respect to the pedal stroke. FIG. 3 illustrates a pedal stroke characteristic with respect to the pedal pressing force (illustrates an F-S characteristic) in the brake system 1 according to the first embodiment. Basically, the stroke simulator 7 is assumed to have a characteristic similar to the characteristic of a negative-pressure booster. Therefore, the F-S characteristic exhibits a sharp gradient (a gradient 1) to express an invalid stroke, a gap due to loose mounting, and the like in a region where the pedal stroke ranges from zero to a stroke A as illustrated in FIG. 3. The F-S characteristic exhibits a milder gradient (a gradient 2) than the gradient 1 because the vehicle is brought into a state with the invalid stroke and the gap due to loose mounting removed therefrom as far as a pedal stroke limit point B in a region where the pedal stroke is greater than the stroke A. The pedal stroke limit point B is a pedal stroke corresponding to a stroke limit point (a simulator stroke limit point) of the piston 71 in the stroke simulator 7. The simulator stroke limit point refers to, for example, the maximum stroke position of the piston 71 due to the abutment of the retainer member 78 with the plug member 76 or the compression of the second damper 742 to reach the compression limit.

Figure 4:
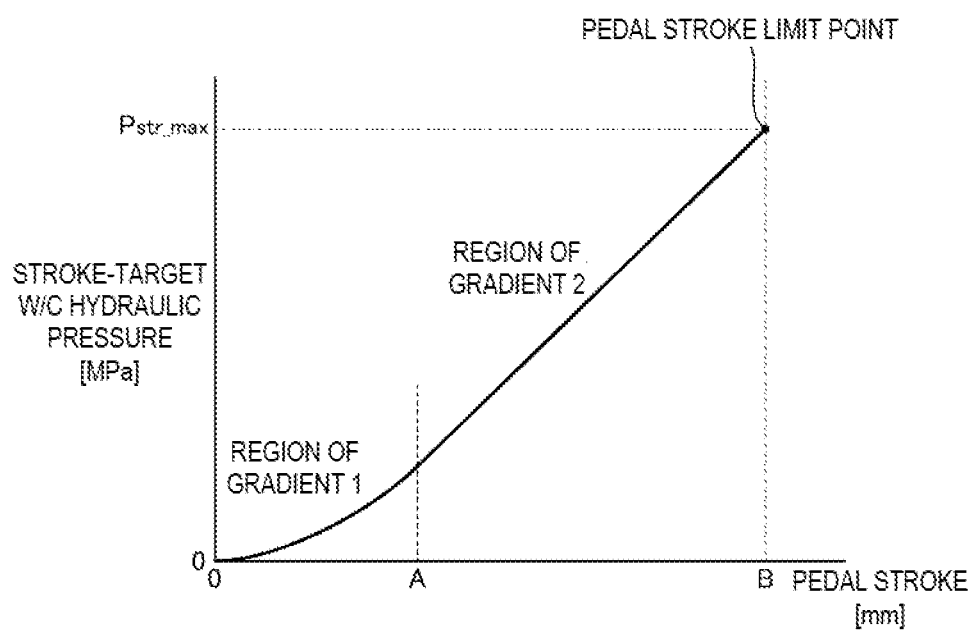
FIG. 4 illustrates a stroke-target wheel cylinder hydraulic pressure characteristic with respect to a pedal stroke according to the first embodiment.

FIG. 4 illustrates the stroke-target wheel cylinder hydraulic pressure characteristic with respect to the pedal stroke set by the stroke-wheel cylinder hydraulic pressure characteristic setting portion 9a according to the first embodiment. For the target wheel cylinder hydraulic pressure characteristic in the region of the gradient 1 where the pedal stroke ranges from zero to the stroke A, a positive increasing function is set while a sensory evaluation is made regarding the starting point of the pressure increase and the gradient of the pressure increase in consideration of the invalid stroke and the gap due to loose mounting. In this case, generally, a linear function is seldom used for the function. On the other hand, for the region of the gradient 2 where the pedal stroke ranges from the stroke A to the pedal stroke limit point B, an excellent pedal feeling can be acquired by expressing the target wheel cylinder hydraulic pressure characteristic with respect to the pedal stroke using a linear function. Preferably, the target wheel cylinder hydraulic pressure in the region of the gradient 2 and the target wheel cylinder hydraulic pressure near the stroke A in the region of the gradient 1 are arranged to have the same gradient, by which a further excellent pedal feeling can be acquired.

A stroke-target wheel cylinder hydraulic pressure calculation portion 9b calculates a stroke-target wheel cylinder hydraulic pressure (a first pressure value) Pstr by referring to the stroke-target wheel cylinder hydraulic pressure characteristic with respect to the pedal stroke set by the stroke-wheel cylinder hydraulic pressure characteristic setting portion 9a (FIG. 4) based on the pedal stroke detected by the stroke sensor 60. The stroke-target wheel cylinder hydraulic pressure Pstr reaches a maximum value Pstr_max when the pedal stroke is the pedal stroke limit point B.

Figure 5:
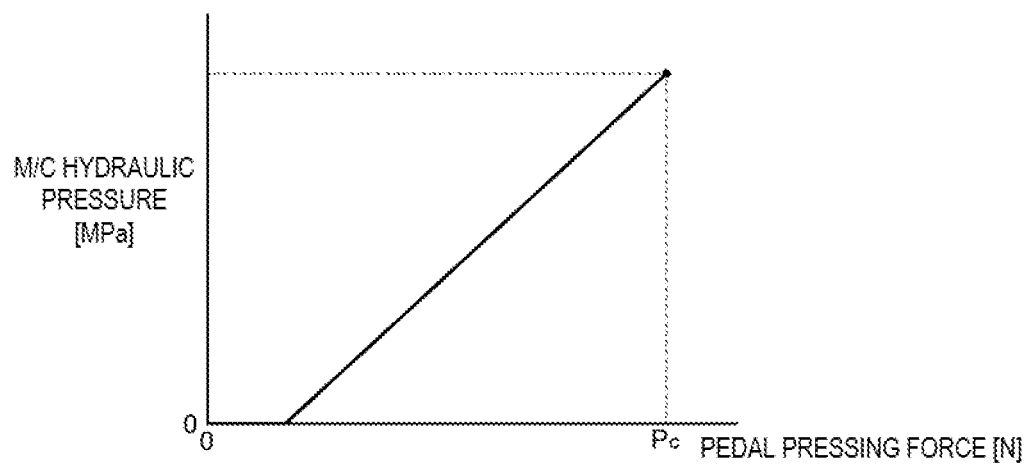
FIG. 5 illustrates a master cylinder hydraulic pressure characteristic with respect to the pedal pressing force in the brake system 1 according to the first embodiment.

A master cylinder hydraulic pressure-wheel cylinder hydraulic pressure characteristic setting portion 9c sets a master cylinder hydraulic pressure-target wheel cylinder hydraulic pressure characteristic with respect to the master cylinder hydraulic pressure. FIG. 5 illustrates a master cylinder hydraulic pressure characteristic with respect to the pedal pressing force in the brake system 1 according to the first embodiment. As illustrated in FIG. 5, in the brake system 1, because the pedal pressing force and the master cylinder hydraulic pressure are in a proportional relationship, the master cylinder hydraulic pressure can be replaced with the pedal pressing force. Therefore, the simulator stroke limit point is determined based on the pedal pressing force, and the master cylinder hydraulic pressure is determined by converting the pedal pressing force into the master cylinder hydraulic pressure. For example, assume that the pedal stroke limit point is a pedal stroke of 60 [mm], and the pedal pressing force at the pedal stroke limit point is 160 [N]. Assuming that the master cylinder hydraulic pressure corresponding to 160 [N] is 2.0 [MPa], the master cylinder hydraulic pressure at the pedal stroke limit point and the simulator stroke limit point is determined to be 2.0 [MPa].

Figure 6:
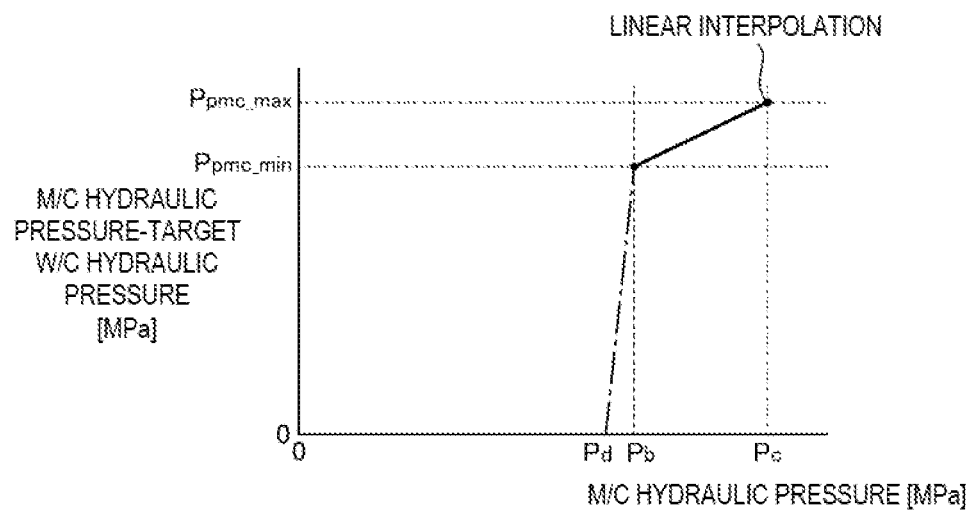
FIG. 6 illustrates a master cylinder hydraulic pressure-target wheel cylinder hydraulic pressure characteristic with respect to a master cylinder hydraulic pressure according to the first embodiment.

FIG. 6 illustrates the master cylinder hydraulic pressure-target wheel cylinder hydraulic pressure characteristic with respect to the master cylinder hydraulic pressure set by the master cylinder hydraulic pressure-wheel cylinder hydraulic pressure characteristic setting portion 9c according to the first embodiment. A master cylinder hydraulic pressure-target wheel cylinder hydraulic pressure Ppmc_min at the pedal stroke limit point B is set to a point at which the master cylinder hydraulic pressure reaches a hydraulic pressure Pb corresponding to a pedal pressing force Ppf_b at the pedal stroke limit point B. An excellent pedal feeling can be acquired by setting a wheel cylinder hydraulic pressure Ppmc_max at which the wheel is desired to be locked and conducting linear interpolation between the two points after that. For example, assuming that the pedal pressing force, the master cylinder hydraulic pressure, and the master cylinder hydraulic pressure-target wheel cylinder hydraulic pressure at the pedal stroke limit point (60 [mm]) are 160 [N], 2.0 [MPa], and 10 [MPa], respectively, the master cylinder hydraulic pressure-target wheel cylinder hydraulic pressure for the master cylinder hydraulic pressure ranging from 2.0 to 4.0 [MPa] is set by setting a master cylinder hydraulic pressure-target wheel cylinder hydraulic pressure of 10.0 [MPa] at the master cylinder hydraulic pressure of 2.0 [MPa] and a master cylinder hydraulic pressure-target wheel cylinder hydraulic pressure of 15.0 [MPa] at the master cylinder hydraulic pressure of 4.0 [MPa] and conducting linear interpolation between 10 [MPa] and 15 [MPa], when aiming at acquiring the wheel cylinder hydraulic pressure of 15 [MPa] at which the wheel lock can be ensured with a pedal pressing force of 300 [N] and a master cylinder hydraulic pressure of 4.0 [MPa]. As indicated by a long dashed short dashed line in FIG. 6, the master cylinder hydraulic pressure-target wheel cylinder hydraulic pressure Ppmc may be set by adding a characteristic acquired by setting the master cylinder hydraulic pressure-target wheel cylinder hydraulic pressure Ppmc to zero as the master cylinder hydraulic pressure corresponding to the simulator stroke limit at a master cylinder hydraulic pressure Pd lower than the master cylinder hydraulic pressure Pb corresponding to the pedal pressing force Ppf_b at the pedal stroke limit point B, and conducting linear interpolation between it and Ppmc_min.

A master cylinder hydraulic pressure-target wheel cylinder hydraulic pressure calculation portion 9d calculates the master cylinder hydraulic pressure-target wheel cylinder hydraulic pressure (a second pressure value) Ppmc by referring to the master cylinder hydraulic pressure-target wheel cylinder hydraulic pressure characteristic with respect to the master cylinder hydraulic pressure set by the master cylinder hydraulic pressure-wheel cylinder hydraulic pressure characteristic setting portion 9c based on the master cylinder hydraulic pressure detected by the master cylinder hydraulic pressure sensor 35.

A stroke simulator stroke limit determination portion 9e determines whether the simulator stroke position reaches the stroke limit (a predetermined position) based on the pedal stroke detected by the stroke sensor 60. Because the simulator stroke is uniquely determined with respect to the pedal stroke, the simulator stroke can be identified based on the acquired pedal stroke. The stroke limit may be the simulator stroke limit point or may be a simulator stroke position short of the simulator stroke limit point.

A final target wheel cylinder hydraulic pressure calculation portion 9f calculates a final target wheel cylinder hydraulic pressure Pfin from the stroke-target wheel cylinder hydraulic pressure Pstr and the master cylinder hydraulic pressure-target wheel cylinder hydraulic pressure Ppmc based on the result of the determination about the stroke limit by the stroke simulator stroke limit determination portion 9e. More specifically, the final target wheel cylinder hydraulic pressure calculation portion 9f sets the stroke-target wheel cylinder hydraulic pressure Pstr as the final target wheel cylinder hydraulic pressure Pfin if the stroke simulator stroke limit determination portion 9e determines that the simulator stroke position does not reach the stroke limit, and sets the master cylinder hydraulic pressure-target wheel cylinder hydraulic pressure Ppmc as the final target wheel cylinder hydraulic pressure Pfin if the stroke simulator stroke limit determination portion 9e determines that the simulator stroke position reaches the stroke limit.

A wheel cylinder hydraulic pressure control portion 9g outputs an instruction signal to each of the actuators in the hydraulic pressure unit 8 in such a manner that the wheel cylinder hydraulic pressure matches the final target wheel cylinder hydraulic pressure Pfin.

Figure 7:
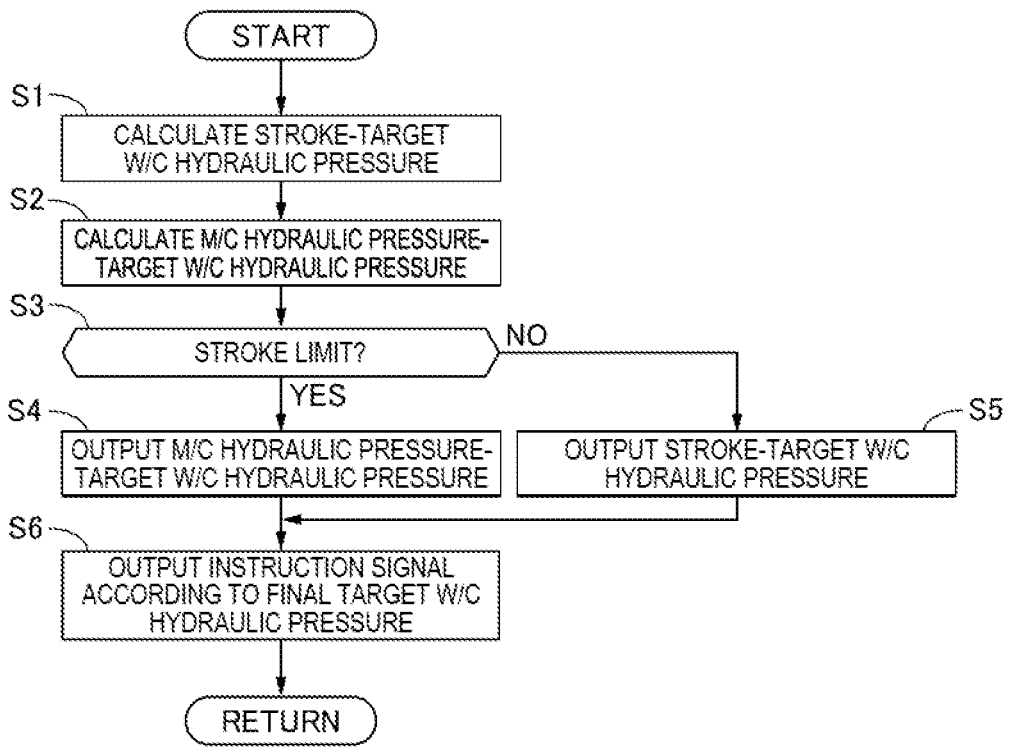
FIG. 7 is a flowchart illustrating a flow of processing for calculating a target wheel cylinder hydraulic pressure performed by the control unit 9 according to the first embodiment.

FIG. 7 is a flowchart illustrating a flow of the processing for calculating the target wheel cylinder hydraulic pressure performed by the control unit 9 according to the first embodiment.

In step S1, the stroke-target wheel cylinder hydraulic pressure calculation portion 9b calculates the stroke-target wheel cylinder hydraulic pressure Pstr.

In step S2, the master cylinder hydraulic pressure-target wheel cylinder hydraulic pressure calculation portion 9d calculates the master cylinder hydraulic pressure-target wheel cylinder hydraulic pressure Ppmc.

In step S3, the stroke simulator stroke limit determination portion 9e determines whether the simulator stroke position reaches the stroke limit. If the determination in step S3 is YES, the processing proceeds to step S4. If the determination in step S3 is NO, the processing proceeds to step S5.

In step S4, the final target wheel cylinder hydraulic pressure calculation portion 9f outputs the master cylinder hydraulic pressure-target wheel cylinder hydraulic pressure Ppmc as the final target wheel cylinder hydraulic pressure Pfin.

In step S5, the final target wheel cylinder hydraulic pressure calculation portion 9f outputs the stroke-target wheel cylinder hydraulic pressure Pstr as the final target wheel cylinder hydraulic pressure Pfin.

In step S6, the wheel cylinder hydraulic pressure control portion 9g outputs the instruction signal to each of the actuators in the hydraulic pressure unit 8 in such a manner that the wheel cylinder hydraulic pressure matches the final target wheel cylinder hydraulic pressure Pfin.

Next, functions and advantageous effects of the first embodiment will be described.

Figure 8:
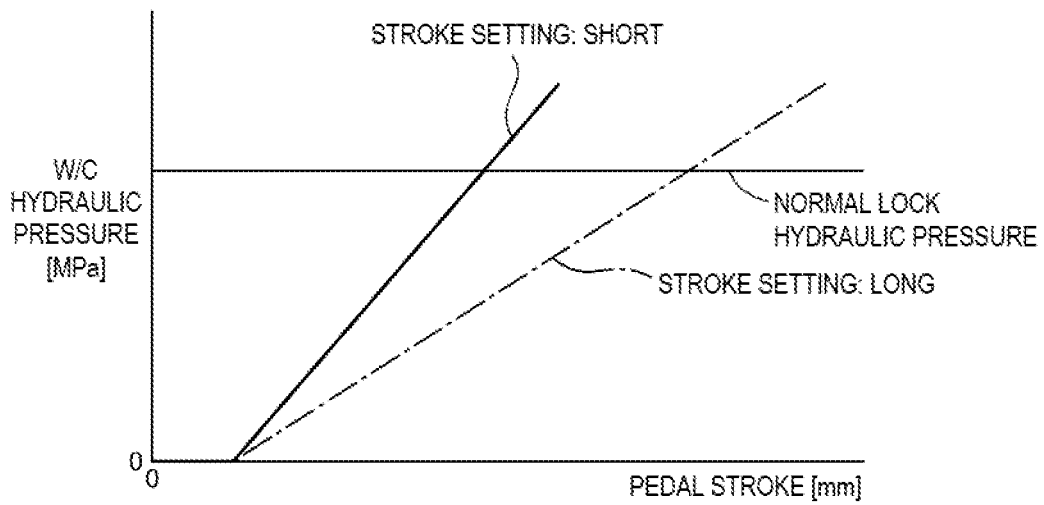
FIG. 8 illustrates a wheel cylinder hydraulic pressure characteristic with respect to the pedal stroke, indicating a problem with the conventional technique (overboosting).

In a case where the stroke of the stroke simulator is set to a relatively long stroke (the range where the piston can stroke is set to a relatively wide range) in a brake-by-wire apparatus, this setting leads to an increase in the pedal stroke during the anti-lock control and thus evokes a pedal feeling different from a standard vehicle, thereby making the driver feel uncomfortable (feel as if pressing the brake pedal through to the floor). If the stroke setting of the stroke simulator is relatively reduced (the range where the piston can stroke is relatively narrowed) as a countermeasure against it, this reduction may result in so-called overboosting, which means an excessively high wheel cylinder hydraulic pressure with respect to the pedal stroke, as illustrated in FIG. 8 at the time of setting the pedal stroke-wheel cylinder hydraulic pressure characteristic for securing the braking force, thereby evoking a pedal feeling with low controllability.

Figure 9:
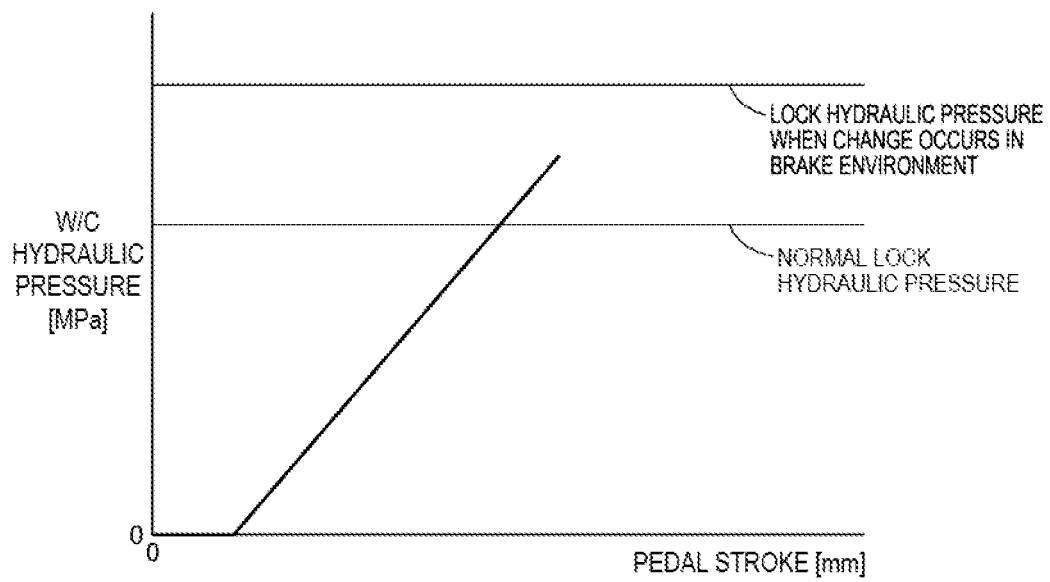
FIG. 9 illustrates the wheel cylinder hydraulic pressure characteristic with respect to the pedal stroke, indicating a problem with the conventional technique (insufficiency of a braking force).

Further, an increase in the lock hydraulic pressure according to a change in the brake environment as illustrated in FIG. 9 (for example, an increase in the brake pad temperature, a change in the caliper or the pad, and the like) may result in a failure to acquire a braking force sufficient to lock the wheel.

On the other hand, in the brake system 1 according to the first embodiment, the control unit 9 determines the final target wheel cylinder hydraulic pressure Pfin of the wheel cylinder 2 based on the stroke-target wheel cylinder hydraulic pressure Pstr if the acquired simulator stroke position is smaller than the stroke limit, and determines the final target wheel cylinder hydraulic pressure Pfin of the wheel cylinder 2 based on the stroke-target wheel cylinder hydraulic pressure Pstr and the master cylinder hydraulic pressure-target wheel cylinder hydraulic pressure Ppmc if the acquired simulator stroke position is equal to or greater than the stroke limit. More specifically, the control unit 9 sets the stroke-target wheel cylinder hydraulic pressure Pstr as the final target wheel cylinder hydraulic pressure Pfin if the acquired simulator stroke position is smaller than the stroke limit, and sets the master cylinder hydraulic pressure-target wheel cylinder hydraulic pressure Ppmc as the final target wheel cylinder hydraulic pressure Pfin if the acquired simulator stroke position is equal to or greater than the stroke limit.

Figure 10:
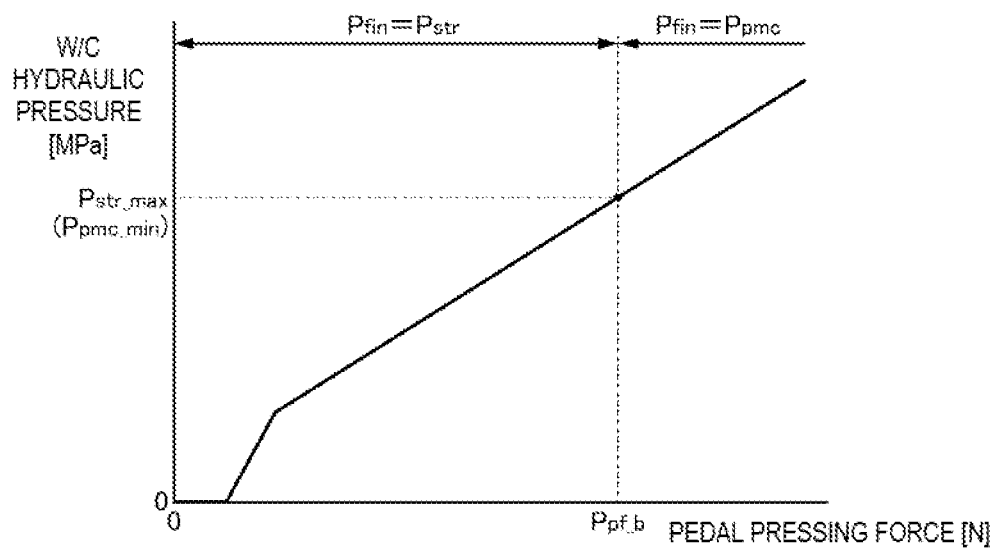
FIG. 10 illustrates a wheel cylinder hydraulic pressure characteristic with respect to the pedal pressing force according to the first embodiment.
Figure 11:
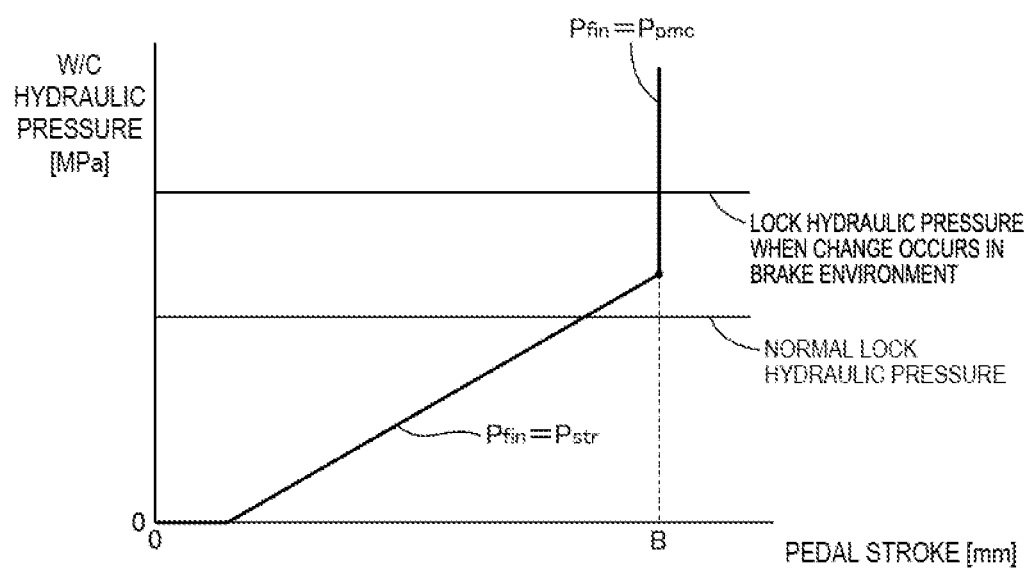
FIG. 11 illustrates a wheel cylinder hydraulic pressure characteristic with respect to the pedal stroke according to the first embodiment.

Therefore, the brake system 1 according to the first embodiment can increase the wheel cylinder hydraulic pressure according to an increase in the master cylinder hydraulic pressure in conjunction with the driver's brake operation even after the simulator stroke position reaches the stroke limit as illustrated in FIGS. 10 and 11. In other words, the brake system 1 can continue the by-wire control even after the simulator stroke position reaches the stroke limit. Therefore, even when a relatively short stroke is set as the stroke of the stroke simulator, the brake system 1 can prevent overboosting and the occurrence of braking force insufficiency due to a change in the brake environment. Further, the brake system 1 allows a relatively short stroke to be set as the stroke of the stroke simulator, thereby preventing the driver from feeling as if pressing the brake pedal through to the floor during the anti-lock control. As a result, the brake system 1 can realize both the securement of the excellent pedal feeing and the securement of the braking force regardless of a change in the brake environment.

The stroke limit of the stroke simulator 7 is the stroke limit point of the stroke simulator 7. Due to this arrangement, the brake system 1 can increase the wheel cylinder hydraulic pressure according to the driver's brake operation even after the simulator stroke position reaches the stroke limit point.

The control unit 9 acquires the simulator stroke position based on the pedal stroke detected by the stroke sensor 60. Since the pedal stroke and the simulator stroke position are in a proportional relationship, the brake system 1 can identify the simulator stroke position without additionally including a sensor for detecting the simulator stroke position.

Second Embodiment

A second embodiment has a basic configuration similar to the first embodiment, and therefore will be described focusing only on differences from the first embodiment.

Figure 12:
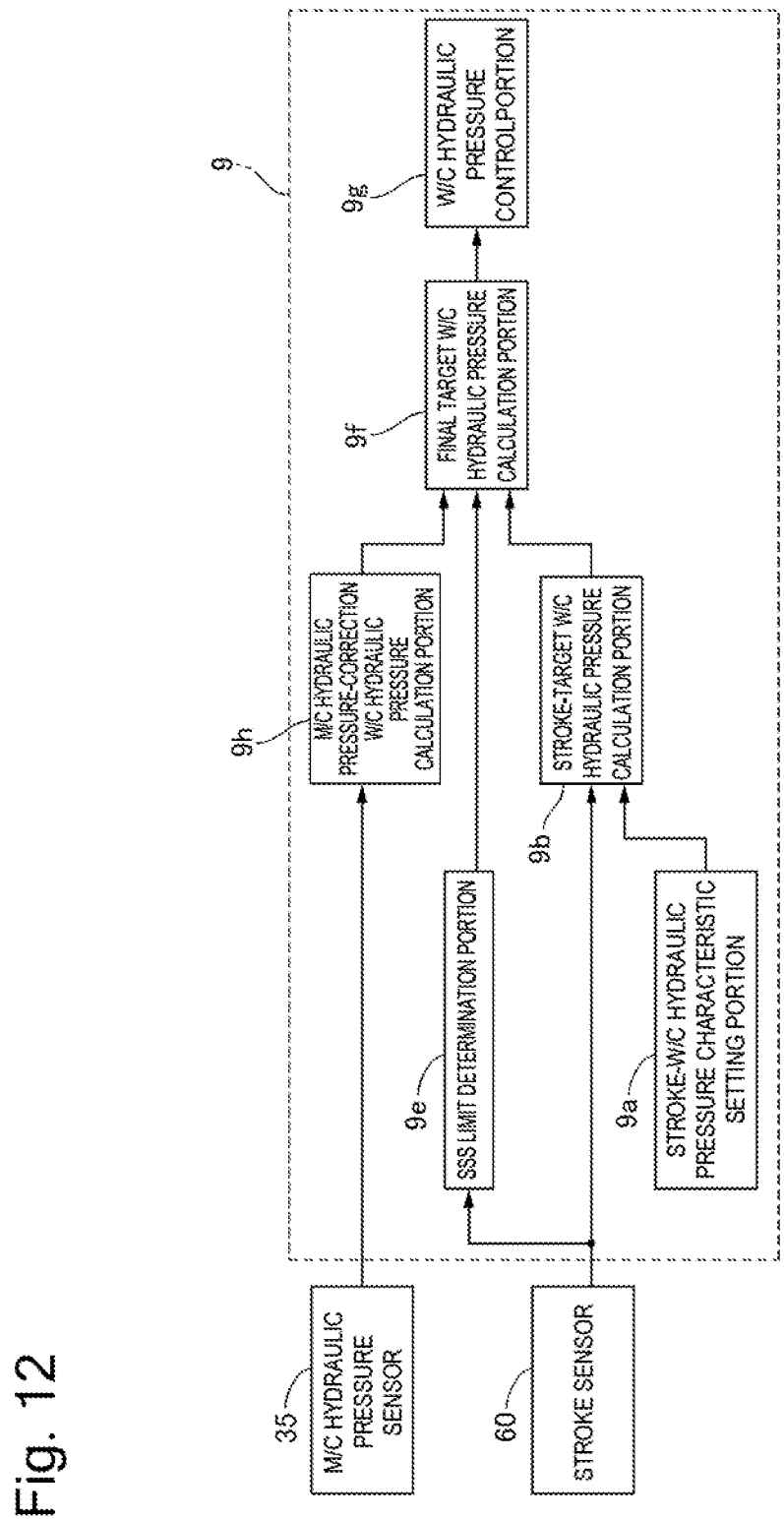
FIG. 12 is a control block diagram of the control unit 9 according to a second embodiment.

FIG. 12 is a control block diagram of the control unit 9 according to the second embodiment.

Figure 13:
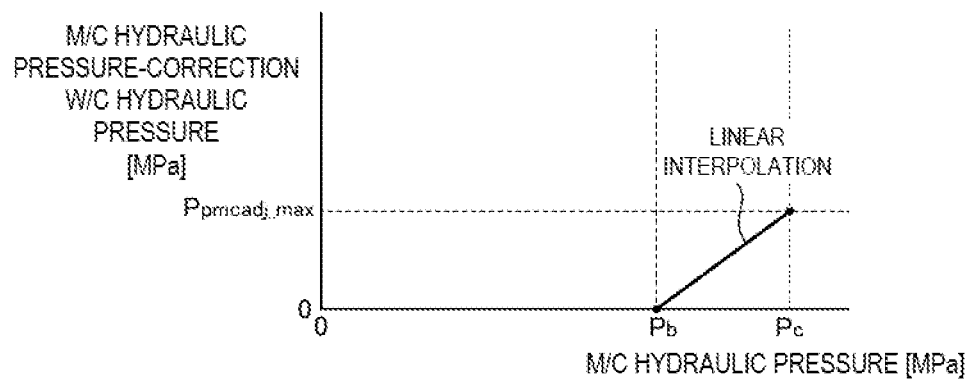
FIG. 13 illustrates a master cylinder hydraulic pressure-correction wheel cylinder hydraulic pressure characteristic with respect to the master cylinder hydraulic pressure according to the second embodiment.

A master cylinder hydraulic pressure-correction wheel cylinder hydraulic pressure calculation portion 9h calculates a master cylinder hydraulic pressure-correction wheel cylinder hydraulic pressure (a second pressure value) Ppmcadj based on the master cylinder hydraulic pressure detected by the master cylinder hydraulic pressure sensor 35. FIG. 13 illustrates a master cylinder hydraulic pressure-correction wheel cylinder hydraulic pressure characteristic with respect to the master cylinder hydraulic pressure according to the second embodiment. The master cylinder hydraulic pressure-correction wheel cylinder hydraulic pressure (=0) at the pedal stroke limit point is set to a point at which the master cylinder hydraulic pressure reaches the hydraulic pressure Pb corresponding to the pedal pressing force Ppf_b at the pedal stroke limit point B. A further excellent pedal feeing can be acquired by setting the master cylinder hydraulic pressure-correction wheel cylinder hydraulic pressure Ppmcadj_max to a value acquired by subtracting the stroke-target wheel cylinder hydraulic pressure Pstr_max at the pedal stroke limit point B from the wheel cylinder hydraulic pressure Ppmc_max at which the wheel is desired to be locked after that.

The final target wheel cylinder hydraulic pressure calculation portion 9f calculates the final target wheel cylinder hydraulic pressure Pfin from the stroke-target wheel cylinder hydraulic pressure Pstr and the master cylinder hydraulic pressure-correction wheel cylinder hydraulic pressure Ppmcadj based on the result of the determination about the stroke limit by the stroke simulator stroke limit determination portion 9e. More specifically, the final target wheel cylinder hydraulic pressure calculation portion 9f sets the stroke-target wheel cylinder hydraulic pressure Pstr as the final target wheel cylinder hydraulic pressure Pfin if the stroke simulator stroke limit determination portion 9e determines that the simulator stroke position does not reach the stroke limit, and sets a value acquired by adding the master cylinder hydraulic pressure-correction wheel cylinder hydraulic pressure Ppmcadj to the stroke-target wheel cylinder hydraulic pressure Pstr as the final target wheel cylinder hydraulic pressure Pfin if the stroke simulator stroke limit determination portion 9e determines that the simulator stroke position reaches the stroke limit.

Figure 14:
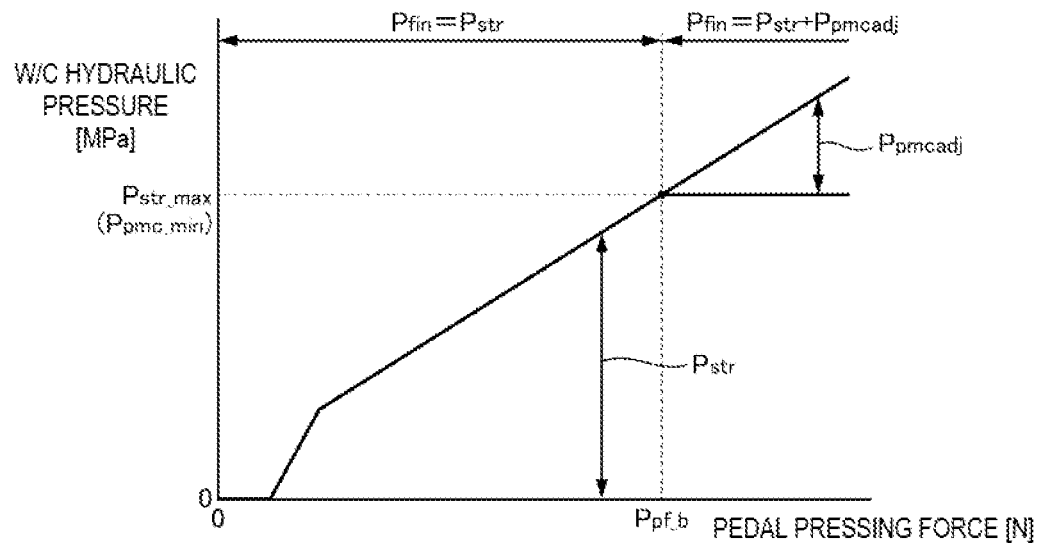
FIG. 14 illustrates a wheel cylinder hydraulic pressure characteristic with respect to the pedal pressing force according to the second embodiment.

In the first embodiment, the final target wheel cylinder hydraulic pressure Pfin is switched from the stroke-target wheel cylinder hydraulic pressure Pstr to the master cylinder hydraulic pressure-target wheel cylinder hydraulic pressure Ppmc when the stroke simulator 7 reaches the stroke limit. Now, theoretically, the stroke-target wheel cylinder hydraulic pressure Pstr_max and the master cylinder hydraulic pressure-target wheel cylinder hydraulic pressure Ppmc_min at the pedal stroke limit point B match each other, but become Pstr_max>Ppmc_min when the stroke-target wheel cylinder hydraulic pressure is lower than the hydraulic pressure according to the actual pedal stroke due to, for example, an error in the detection by the stroke sensor 60. This may cause a discontinuous point (a step) to emerge in the final target wheel cylinder hydraulic pressure Pfin when it is switched from the stroke-target wheel cylinder hydraulic pressure Pstr to the master cylinder hydraulic pressure-target wheel cylinder hydraulic pressure Ppmc, thereby making the driver uncomfortable. Therefore, according to the second embodiment, the stroke-target wheel cylinder hydraulic pressure Pstr is corrected based on the master cylinder hydraulic pressure-correction wheel cylinder hydraulic pressure Ppmcadj and is then set as the final target wheel cylinder hydraulic pressure Pfin when the stroke simulator 7 reaches the stroke limit as illustrated in FIG. 14. As a result, when an error has occurred in the detection by the stroke sensor 60, the brake system 1 can prevent the above-described discontinuous point from emerging although the gradient changes, thereby making the driver feel less uncomfortable.

Third Embodiment

A third embodiment has a basic configuration similar to the second embodiment, and therefore will be described focusing only on differences from the second embodiment.

Figure 15:
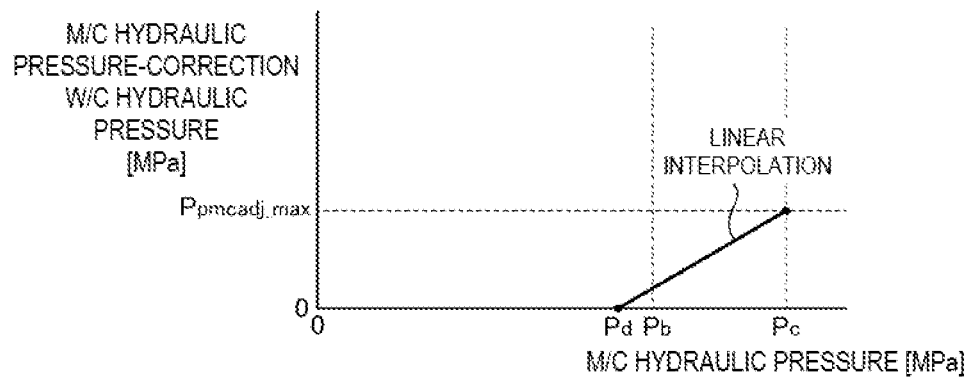
FIG. 15 illustrates a master cylinder hydraulic pressure-correction wheel cylinder hydraulic pressure characteristic with respect to the master cylinder hydraulic pressure according to a third embodiment.

FIG. 15 illustrates a master cylinder hydraulic pressure-correction wheel cylinder hydraulic pressure characteristic with respect to the master cylinder hydraulic pressure according to the third embodiment.

Figure 16:
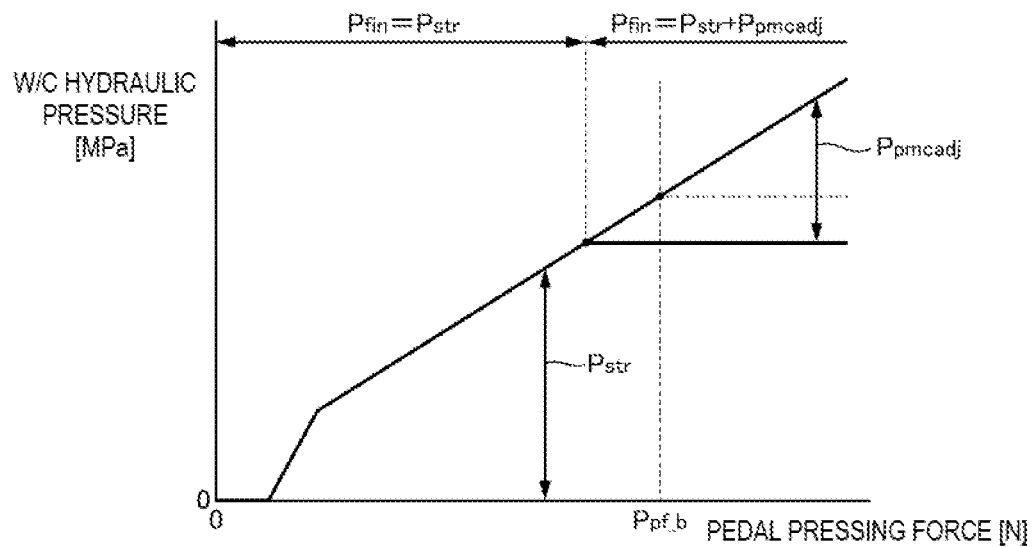
FIG. 16 illustrates a wheel cylinder hydraulic pressure characteristic with respect to the pedal pressing force according to the third embodiment.
Figure 17:
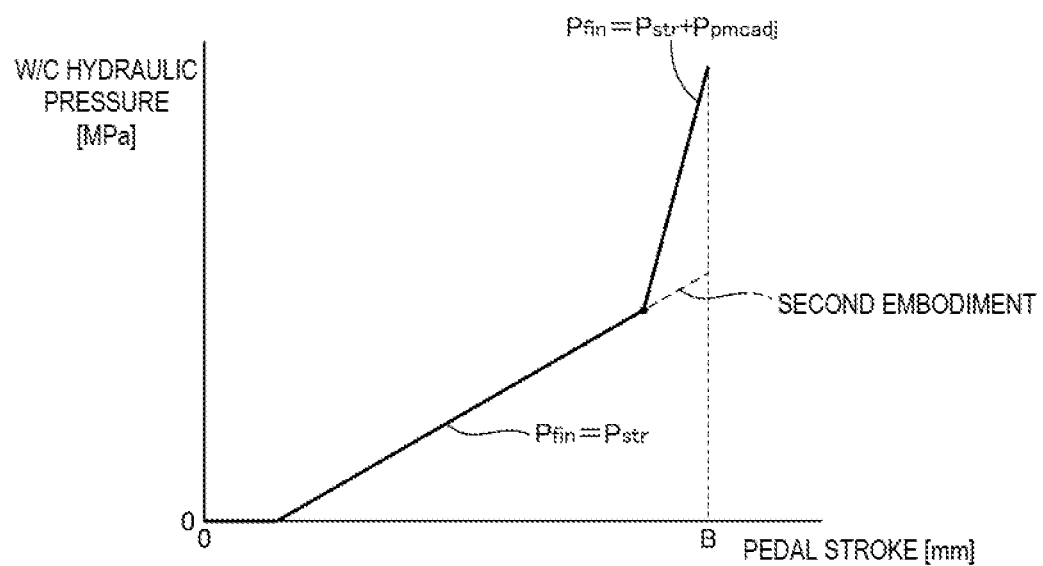
FIG. 17 illustrates a wheel cylinder hydraulic pressure characteristic with respect to the pedal stroke according to the third embodiment.

According to the third embodiment, the master cylinder hydraulic pressure-correction wheel cylinder hydraulic pressure Ppmcadj is set by setting the master cylinder hydraulic pressure-correction wheel cylinder hydraulic pressure Ppmcadj to zero as the master cylinder hydraulic pressure corresponding to the simulator stroke limit at the master cylinder hydraulic pressure Pd lower than the master cylinder hydraulic pressure Pb corresponding to the pedal pressing force Ppf_b at the pedal stroke limit point B, and conducting linear interpolation between it and Ppmc_max at which the wheel is desired to be locked. This allows the wheel cylinder hydraulic pressure to have a milder gradient after the correction based on the master cylinder hydraulic pressure-correction wheel cylinder hydraulic pressure Ppmcadj compared to the gradient in the case of the second embodiment as illustrated in FIGS. 16 and 17, thereby being able to achieve a further less unconformable feeling.

OTHER EMBODIMENTS

Having described the embodiments for implementing the present invention, the specific configuration of the present invention is not limited to the configurations of the embodiments, and the present invention also includes even a design modification and the like thereof made within a range that does not depart from the spirit of the present invention, if any.

For example, the method for acquiring the stroke position of the stroke simulator is not limited to the stroke sensor of the brake pedal, and the stroke position may be directly detected by, for example, installing a sensor for detecting the position of the piston on the stroke simulator.

The position regarding the stroke limit of the stroke simulator is not limited to the stroke limit point, and may be a stroke position located near the stroke limit point and smaller than the stroke limit point.

The structure of the stroke simulator can be arbitrarily set.

In the following description, technical ideas recognizable from the above-described embodiments will be described.

A brake control apparatus, according to one configuration thereof, includes a connection fluid passage connecting a master cylinder and a braking force application portion to each other with the braking force application portion configured to apply a braking force to a wheel portion according to a brake hydraulic pressure, a shut-off valve provided in the connection fluid passage, a hydraulic pressure source configured to supply brake fluid to a fluid passage of the connection fluid passage that is located between the shut-off valve and the braking force application portion, a pressure sensor configured to detect a hydraulic pressure in the master cylinder, and a control unit. The control unit is configured to determine a first pressure value, which is a physical amount regarding the brake hydraulic pressure, based on a value detected by a stroke sensor configured to detect a physical amount regarding a stroke of a brake pedal, determine a second pressure value, which is a physical amount regarding the brake hydraulic pressure, based on a value detected by the pressure sensor, acquire a simulator stroke position, which is a physical amount regarding a stroke position of a stroke simulator configured to generate an operation reaction force of the brake pedal, determine a physical amount regarding the brake hydraulic pressure to generate in the braking force application portion based on the first pressure value in a case where the acquired simulator stroke position is smaller than a preset predetermined position, and determine the physical amount regarding the brake hydraulic pressure to generate in the braking force application portion based on the first pressure value and the second pressure value in a case where the acquired simulator stroke position is equal to or greater than the preset predetermined position.

According to a further preferable configuration, in the above-described configuration, the predetermined position is a position regarding a stoke limit of the stroke simulator.

According to another preferable configuration, in any of the above-described configurations, the control unit sets the first physical amount as the physical amount regarding the brake hydraulic pressure to generate in the braking force application portion in the case where the acquired simulator stroke position is smaller than the predetermined position, and sets the second physical amount as the physical amount regarding the brake hydraulic pressure to generate in the braking force application portion in the case where the acquired simulator stroke position is equal to or greater than the predetermined position.

According to further another preferable configuration, in any of the above-described configurations, the predetermined position is a stoke limit point of the stroke simulator.

According to further another preferable configuration, in any of the above-described configurations, the control unit sets the first physical amount as the physical amount regarding the brake hydraulic pressure to generate in the braking force application portion in the case where the acquired simulator stroke position is smaller than the predetermined position, and corrects the first physical amount based on the second physical amount and sets the first physical amount corrected based on the second physical amount as the physical amount regarding the brake hydraulic pressure to generate in the braking force application portion in the case where the acquired simulator stroke position is equal to or greater than the predetermined position.

According to further another preferable configuration, in any of the above-described configurations, the predetermined position is a stoke limit point of the stroke simulator.

According to further another preferable configuration, in any of the above-described configurations, the predetermined position is a position short of a stoke limit point of the stroke simulator.

According to further another preferable configuration, in any of the above-described configurations, the predetermined position is a stoke limit point of the stroke simulator.

According to further another preferable configuration, in any of the above-described configurations, the predetermined position is a position short of a stoke limit point of the stroke simulator.

According to further another preferable configuration, in any of the above-described configurations, the control unit acquires the simulator stroke position based on the value detected by the stroke sensor.

Further, from another aspect, a brake control apparatus, according to one configuration thereof, includes a connection fluid passage connecting a master cylinder and a braking force application portion to each other with the braking force application portion configured to apply a braking force to a wheel portion according to a brake hydraulic pressure, a shut-off valve provided in the connection fluid passage, a hydraulic pressure source configured to supply brake fluid to a fluid passage of the connection fluid passage that is located between the shut-off valve and the braking force application portion, and a control unit. The control unit is configured to control the hydraulic pressure source so as to increase the brake hydraulic pressure to generate in the braking force application portion according to an increase in a stroke of a brake pedal, and control the hydraulic pressure source so as to increase the brake hydraulic pressure to generate in the braking force application portion even after a stroke of a stroke simulator configured to generate an operation reaction force of the brake pedal is restricted.

Further, from another aspect, a brake system, according to one configuration thereof, includes a stroke simulator, and a hydraulic pressure unit. The stroke simulator includes a first chamber connected to a master cylinder, and a second chamber separated from the first chamber by a piston. The hydraulic pressure unit includes a connection fluid passage connecting the master cylinder and a braking force application portion to each other with the braking force application portion configured to apply a braking force to a wheel portion according to a brake hydraulic pressure, a shut-off valve provided in the connection fluid passage, a hydraulic pressure source configured to supply brake fluid to a fluid passage of the connection fluid passage that is located between the shut-off valve and the braking force application portion, a pressure sensor configured to detect a hydraulic pressure in the master cylinder, and a control unit. The control unit is configured to determine a first pressure value, which is a physical amount regarding the brake hydraulic pressure, based on a value detected by a stroke sensor configured to detect a physical amount regarding a stroke of a brake pedal, and determine a second pressure value, which is a physical amount regarding the brake hydraulic pressure, based on a value detected by the pressure sensor, acquire a piston stroke position, which is a physical amount regarding a stroke position of the piston, determine a physical amount regarding the brake hydraulic pressure to generate in the braking force application portion based on the first pressure value in a case where the acquired piston stroke position is smaller than a preset predetermined position, and determine the physical amount regarding the brake hydraulic pressure to generate in the braking force application portion based on the first pressure value and the second pressure value in a case where the acquired piston stroke position is equal to or greater than the preset predetermined position.

Preferably, in the above-described configuration, the predetermined position is a position regarding a stoke limit point of the stroke simulator.

The present invention shall not be limited to the above-described embodiments, and includes various modifications. For example, the above-described embodiments have been described in detail to facilitate a better understanding of the present invention, and the present invention shall not necessarily be limited to the configuration including all of the described features. Further, a part of the configuration of some embodiment can be replaced with the configuration of another embodiment. Further, some embodiment can also be implemented with a configuration of another embodiment added to the configuration of this embodiment. Further, each of embodiments can also be implemented with another configuration added, deleted, or replaced with respect to a part of the configuration of this embodiment.

The present application claims priority under the Paris Convention to Japanese Patent Application No. 2018-215123 filed on Nov. 16, 2018. The entire disclosure of Japanese Patent Application No. 2018-215123 filed on Nov. 16, 2018 including the specification, the claims, the drawings, and the abstract is incorporated herein by reference in its entirety.

REFERENCE SIGNS LIST

FL to RR wheel (wheel portion)
1 brake system
2 wheel cylinder (braking force application portion)
3 brake pedal
5 master cylinder
7 stroke simulator
8 hydraulic pressure unit
9 control unit
11 fluid passage (connection fluid passage)
12 shut-off valve
21 pump (hydraulic pressure source)
35 master cylinder hydraulic pressure sensor (pressure sensor)
60 stroke sensor
71 piston
711 positive pressure chamber (first chamber)
712 back-pressure chamber (second chamber)

The invention claimed is:

1. A brake control apparatus comprising:
a connection fluid passage that connects a master cylinder and a braking force application portion to each other, the braking force application portion being configured to apply a braking force to a wheel portion (FL to RR) according to a brake hydraulic pressure;
a shut-off valve provided in the connection fluid passage;
a hydraulic pressure source configured to supply brake fluid to a fluid passage of the connection fluid passage that is located between the shut-off valve and the braking force application portion;
a pressure sensor configured to detect a hydraulic pressure in the master cylinder; and
a control unit, the control unit including:
a stroke-wheel cylinder hydraulic pressure characteristic setting portion configured to set a stroke-target wheel cylinder hydraulic pressure characteristic with respect to the pedal stroke;
a stroke-target wheel cylinder hydraulic pressure calculation portion configured to calculate a first pressure value Pstr by referring to the stroke-target wheel cylinder hydraulic pressure characteristic with respect to the pedal stroke set by the stroke-wheel cylinder hydraulic pressure characteristic setting portion based on the pedal stroke detected by the stroke sensor;
a master cylinder hydraulic pressure-wheel cylinder hydraulic pressure characteristic setting portion configured to set a master cylinder hydraulic pressure-target wheel cylinder hydraulic pressure characteristic with respect to the master cylinder hydraulic pressure; and
a master cylinder hydraulic pressure-target wheel cylinder hydraulic pressure calculation portion configured to calculate a second pressure value Ppmc by referring to the master cylinder hydraulic pressure-target wheel cylinder hydraulic pressure characteristic with respect to the master cylinder hydraulic pressure set by the master cylinder hydraulic pressure-wheel cylinder hydraulic pressure characteristic setting portion based on the master cylinder hydraulic pressure detected by the master cylinder hydraulic pressure sensor,
the control unit being configured to:
acquire a simulator stroke position of a stroke simulator configured to generate an operation reaction force of the brake pedal,
determine brake hydraulic pressure to generate in the braking force application portion based on the first pressure value in a case where the acquired simulator stroke position is smaller than a preset predetermined position, and
determine brake hydraulic pressure to generate in the braking force application portion based on the first pressure value and the second pressure value in a case where the acquired simulator stroke position is equal to or greater than the preset predetermined position.

2. The brake control apparatus according to claim 1, wherein the predetermined position is a position regarding a stoke limit of the stroke simulator.

3. The brake control apparatus according to claim 2, wherein the control unit
sets the first pressure value Pstr as brake hydraulic pressure to generate in the braking force application portion in the case where the acquired simulator stroke position is smaller than the predetermined position, and
sets the second pressure value Ppmc as brake hydraulic pressure to generate in the braking force application portion in the case where the acquired simulator stroke position is equal to or greater than the predetermined position.

4. The brake control apparatus according to claim 3, wherein the predetermined position is a stoke limit point of the stroke simulator.

5. The brake control apparatus according to claim 2, wherein the control unit
sets the first pressure value Pstr as brake hydraulic pressure to generate in the braking force application portion in the case where the acquired simulator stroke position is smaller than the predetermined position, and
corrects the first pressure value Pstr based on the second pressure value Ppmc and sets the first pressure value Pstr corrected based on the second pressure value Ppmc as brake hydraulic pressure to generate in the braking force application portion in the case where the acquired simulator stroke position is equal to or greater than the predetermined position.

6. The brake control apparatus according to claim 5, wherein the predetermined position is a stoke limit point of the stroke simulator.

7. The brake control apparatus according to claim 5, wherein the predetermined position is a position short of a stoke limit point of the stroke simulator.

8. The brake control apparatus according to claim 2, wherein the predetermined position is a stoke limit point of the stroke simulator.

9. The brake control apparatus according to claim 2, wherein the predetermined position is a position short of a stoke limit point of the stroke simulator.

10. The brake control apparatus according to claim 1, wherein the control unit acquires the simulator stroke position based on the value detected by the stroke sensor.

11. A brake system comprising:
a stroke simulator; and
a hydraulic pressure unit,
the stroke simulator including
a first chamber connected to a master cylinder, and
a second chamber separated from the first chamber by a piston,
the hydraulic pressure unit including
a connection fluid passage that connects the master cylinder and a braking force application portion to each other, the braking force application portion being configured to apply a braking force to a wheel portion (FL to RR) according to a brake hydraulic pressure,
a shut-off valve provided in the connection fluid passage,
a hydraulic pressure source configured to supply brake fluid to a fluid passage of the connection fluid passage that is located between the shut-off valve and the braking force application portion,
a pressure sensor configured to detect a hydraulic pressure in the master cylinder, and
a control unit, the control unit including:
a stroke-wheel cylinder hydraulic pressure characteristic setting portion configured to set a stroke-target wheel cylinder hydraulic pressure characteristic with respect to the pedal stroke;
a stroke-target wheel cylinder hydraulic pressure calculation portion configured to calculate a first pressure value Pstr by referring to the stroke-target wheel cylinder hydraulic pressure characteristic with respect to the pedal stroke set by the stroke-wheel cylinder hydraulic pressure characteristic setting portion based on the pedal stroke detected by the stroke sensor;

a master cylinder hydraulic pressure-wheel cylinder hydraulic pressure characteristic setting portion configured to set a master cylinder hydraulic pressure-target wheel cylinder hydraulic pressure characteristic with respect to the master cylinder hydraulic pressure; and a master cylinder hydraulic pressure-target wheel cylinder hydraulic pressure calculation portion configured to calculate a second pressure value Ppmc by referring to the master cylinder hydraulic pressure-target wheel cylinder hydraulic pressure characteristic with respect to the master cylinder hydraulic pressure set by the master cylinder hydraulic pressure-wheel cylinder hydraulic pressure characteristic setting portion based on the master cylinder hydraulic pressure detected by the master cylinder hydraulic pressure sensor, the control unit being configured to:

acquire a piston stroke position of the piston, determine brake hydraulic pressure to generate in the braking force application portion based on the first pressure value in a case where the acquired piston stroke position is smaller than a preset predetermined position, and determine brake hydraulic pressure to generate in the braking force application portion based on the first pressure value and the second pressure value in a case where the acquired piston stroke position is equal to or greater than the preset predetermined position.

12. The brake control apparatus according to claim 11, wherein the predetermined position is a position regarding a stoke limit point of the stroke simulator.

* * * * *